US010657273B2

(12) United States Patent
Erickson et al.

(10) Patent No.: US 10,657,273 B2
(45) Date of Patent: *May 19, 2020

(54) SYSTEMS AND METHODS FOR AUTOMATIC AND CUSTOMIZABLE DATA MINIMIZATION OF ELECTRONIC DATA STORES

(71) Applicant: PALANTIR TECHNOLOGIES INC., Palo Alto, CA (US)

(72) Inventors: Kyle Erickson, Cupertino, CA (US); Nicholas Miyake, Redwood City, CA (US); Dominique Alessi, Los Angeles, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,490

(22) Filed: Mar. 5, 2018

(65) Prior Publication Data
US 2018/0196954 A1      Jul. 12, 2018

Related U.S. Application Data

(63) Continuation of application No. 15/071,064, filed on Mar. 15, 2016, now Pat. No. 9,916,465.
(Continued)

(51) Int. Cl.
*G06F 21/62* (2013.01)
*G06F 3/0481* (2013.01)
(Continued)

(52) U.S. Cl.
CPC ........ *G06F 21/6209* (2013.01); *G06F 3/0481* (2013.01); *G06F 21/604* (2013.01);
(Continued)

(58) Field of Classification Search
CPC .... G06F 21/604; G06F 21/62; G06F 21/6209; G06F 21/6227; H04L 63/0428
See application file for complete search history.

(56) References Cited

U.S. PATENT DOCUMENTS 5,978,475 A    11/1999  Schneier et al.
6,253,203 B1 *  6/2001  O'Flaherty ......... G06F 21/6245
                        (Continued)

FOREIGN PATENT DOCUMENTS

CN    101729531    6/2010
CN    103281301    9/2013
                    (Continued)

OTHER PUBLICATIONS

Park, Youngja, et al. "System for automatic estimation of data sensitivity with applications to access control and other applications." Proceedings of the 16th ACM symposium on Access control models and technologies. pp. 145-146. ACM, 2011. (Year: 2011).*
(Continued)

*Primary Examiner* — Kari L Schmidt
(74) *Attorney, Agent, or Firm* — Knobbe Martens Olson & Bear LLP

(57) ABSTRACT

A dynamic data minimization server implements minimization protocols to entity-specific information based on access rights (e.g., privacy rights) of a requesting entity. The minimization may be applied on the fly (e.g., as the entity-specific information is requested) and the level, type, protocol, etc., of encryption (or other minimization process) may be selected based on a particular type of a data item. The dynamic data minimization server may determine and apply transformation functions, such as encryption, to items of protected information, transforming those items of protected information into items of minimized information. If a requesting entity has appropriate rights, the dynamic data minimization server may selectively apply a reverse trans-
(Continued)

formation function, such as decryption, to recover the original information. The systems and methods include generation and presentation of user interfaces for presenting minimized information and processing requests to de-minimize information, and may be used to provide minimization services to pre-existing data stores.

19 Claims, 11 Drawing Sheets

Related U.S. Application Data

(60) Provisional application No. 62/272,624, filed on Dec. 29, 2015.

(51) Int. Cl.
   *G06F 21/60* (2013.01)
   *H04L 29/06* (2006.01)

(52) U.S. Cl.
   CPC .......... *G06F 21/62* (2013.01); *G06F 21/6218* (2013.01); *G06F 21/6227* (2013.01); *H04L 63/0428* (2013.01)

(56) References Cited

U.S. PATENT DOCUMENTS

| | | | |
|---|---|---|---|
| 6,725,240 B1 | 4/2004 | Asad et al. | |
| 6,807,569 B1 | 10/2004 | Bhimani et al. | |
| 6,892,201 B2* | 5/2005 | Brown | G06F 21/6218 |
| 7,017,046 B2 | 3/2006 | Doyle et al. | |
| 7,069,586 B1 | 6/2006 | Winneg et al. | |
| 7,225,468 B2 | 5/2007 | Waisman et al. | |
| 7,512,985 B1* | 3/2009 | Grabarnik | G06F 21/6263 |
| | | | 707/999.009 |
| 7,596,285 B2 | 9/2009 | Brown et al. | |
| 7,669,051 B2* | 2/2010 | Redlich | C07K 14/70575 |
| | | | 713/166 |
| 7,770,032 B2 | 8/2010 | Nesta et al. | |
| 7,801,871 B2 | 9/2010 | Gosnell | |
| 7,962,495 B2 | 6/2011 | Jain et al. | |
| 8,078,595 B2* | 12/2011 | King | G06F 21/6227 |
| | | | 707/694 |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,301,904 B1 | 10/2012 | Gryaznov | |
| 8,312,546 B2 | 11/2012 | Alme | |
| 8,646,080 B2 | 2/2014 | Williamson et al. | |
| 8,649,552 B2* | 2/2014 | Balakrishnan | G06F 17/2276 |
| | | | 380/243 |
| 8,661,263 B2* | 2/2014 | Mattsson | G06F 21/6209 |
| | | | 713/189 |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,931,043 B2 | 1/2015 | Cooper et al. | |
| 8,983,985 B2* | 3/2015 | Chen | G06F 17/30 |
| | | | 707/754 |
| 9,021,260 B1 | 4/2015 | Falk et al. | |
| 9,031,870 B2* | 5/2015 | Kenedy | G06F 17/30867 |
| | | | 705/26.7 |
| 9,049,117 B1 | 6/2015 | Nucci et al. | |
| 9,100,428 B1 | 8/2015 | Visbal | |
| 9,335,897 B2 | 5/2016 | Goldenberg | |
| 9,338,013 B2 | 5/2016 | Castellucci et al. | |
| 9,384,028 B1* | 7/2016 | Felstaine | H04L 67/02 |
| 9,916,465 B1 | 3/2018 | Erickson et al. | |
| 10,049,227 B1* | 8/2018 | Sampson | G06F 21/6254 |
| 2002/0112157 A1 | 8/2002 | Doyle et al. | |
| 2003/0014394 A1 | 1/2003 | Fujiwara et al. | |
| 2003/0115481 A1* | 6/2003 | Baird | G06F 21/6218 |
| | | | 726/4 |
| 2003/0158842 A1* | 8/2003 | Levy | G06F 17/30445 |
| 2004/0123139 A1 | 6/2004 | Aiello et al. | |
| 2004/0139043 A1 | 7/2004 | Lei et al. | |
| 2004/0153418 A1 | 8/2004 | Hanweck | |
| 2004/0250124 A1 | 12/2004 | Chesla et al. | |
| 2004/0267824 A1* | 12/2004 | Pizzo | G06F 17/30902 |
| 2005/0157662 A1 | 7/2005 | Bingham et al. | |
| 2005/0229256 A2 | 10/2005 | Banzhof | |
| 2005/0262556 A1 | 11/2005 | Waisman et al. | |
| 2005/0275638 A1 | 12/2005 | Kolmykov-Zotov et al. | |
| 2005/0289342 A1* | 12/2005 | Needham | G06F 21/6227 |
| | | | 713/169 |
| 2006/0031928 A1 | 2/2006 | Conley et al. | |
| 2006/0069912 A1 | 3/2006 | Zheng et al. | |
| 2006/0074897 A1* | 4/2006 | Fergusson | G06F 17/30699 |
| 2006/0179003 A1* | 8/2006 | Steele | G06Q 20/382 |
| | | | 705/59 |
| 2006/0212931 A1 | 9/2006 | Shull et al. | |
| 2006/0218637 A1 | 9/2006 | Thomas et al. | |
| 2006/0230462 A1* | 10/2006 | Prabakar | G06F 21/6254 |
| | | | 726/27 |
| 2006/0265747 A1 | 11/2006 | Judge | |
| 2007/0143851 A1 | 6/2007 | Nicodemus | |
| 2007/0294766 A1 | 12/2007 | Mir et al. | |
| 2008/0065665 A1* | 3/2008 | Pomroy | G06F 17/30286 |
| 2008/0104407 A1 | 5/2008 | Horne et al. | |
| 2008/0118150 A1* | 5/2008 | Balakrishnan | G06F 17/2276 |
| | | | 382/176 |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2009/0103442 A1 | 4/2009 | Douville | |
| 2009/0178144 A1* | 7/2009 | Redlich | G06F 21/6209 |
| | | | 726/27 |
| 2009/0228701 A1 | 9/2009 | Lin | |
| 2009/0328222 A1 | 12/2009 | Helman et al. | |
| 2010/0005509 A1* | 1/2010 | Peckover | G06F 21/10 |
| | | | 726/3 |
| 2010/0077481 A1 | 3/2010 | Polyakov et al. | |
| 2010/0100963 A1 | 4/2010 | Mahaffey | |
| 2010/0179831 A1* | 7/2010 | Brown | G06Q 10/06 |
| | | | 705/3 |
| 2010/0205189 A1* | 8/2010 | Ebrahimi | G06F 21/62 |
| | | | 707/757 |
| 2010/0235915 A1 | 9/2010 | Memon et al. | |
| 2010/0262688 A1 | 10/2010 | Hussain et al. | |
| 2010/0330801 A1 | 12/2010 | Rouh | |
| 2011/0060910 A1 | 3/2011 | Gormish et al. | |
| 2011/0113050 A1 | 5/2011 | Youn et al. | |
| 2011/0131222 A1* | 6/2011 | DiCrescenzo | G06F 17/30539 |
| | | | 707/757 |
| 2011/0202555 A1 | 8/2011 | Cordover et al. | |
| 2011/0219450 A1 | 9/2011 | McDougal et al. | |
| 2011/0321139 A1* | 12/2011 | Jayaraman | G06F 21/51 |
| | | | 726/4 |
| 2012/0079592 A1 | 3/2012 | Pandrangi | |
| 2012/0084866 A1 | 4/2012 | Stolfo | |
| 2012/0110633 A1 | 5/2012 | An et al. | |
| 2012/0110674 A1 | 5/2012 | Belani et al. | |
| 2012/0151597 A1* | 6/2012 | Gupta | G06F 21/6254 |
| | | | 726/26 |
| 2012/0169593 A1 | 7/2012 | Mak et al. | |
| 2012/0197919 A1* | 8/2012 | Chen | G06F 17/30315 |
| | | | 707/757 |
| 2012/0218305 A1 | 8/2012 | Patterson et al. | |
| 2012/0254129 A1 | 10/2012 | Wheeler et al. | |
| 2012/0266245 A1 | 10/2012 | McDougal et al. | |
| 2012/0284791 A1 | 11/2012 | Miller et al. | |
| 2012/0304244 A1 | 11/2012 | Xie et al. | |
| 2012/0323829 A1 | 12/2012 | Stokes et al. | |
| 2012/0330801 A1 | 12/2012 | McDougal et al. | |
| 2013/0019306 A1 | 1/2013 | Lagar-Cavilla et al. | |
| 2013/0097709 A1 | 4/2013 | Basavapatna et al. | |
| 2013/0110876 A1* | 5/2013 | Meijer | G06F 21/6227 |
| | | | 707/783 |
| 2013/0139268 A1 | 5/2013 | An et al. | |

(56) References Cited

U.S. PATENT DOCUMENTS

| | | |
|---|---|---|
| 2013/0239217 A1 | 9/2013 | Kindler et al. |
| 2014/0013451 A1* | 1/2014 | Kulka .................. G06F 21/14 726/29 |
| 2014/0059683 A1 | 2/2014 | Ashley |
| 2014/0123279 A1 | 5/2014 | Bishop et al. |
| 2014/0143009 A1 | 5/2014 | Brice et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0229422 A1 | 8/2014 | Jain et al. |
| 2014/0281512 A1* | 9/2014 | Arasu ................. G06F 21/602 713/165 |
| 2014/0283107 A1* | 9/2014 | Walton ................. G06F 21/62 726/27 |
| 2014/0366132 A1 | 12/2014 | Stiansen et al. |
| 2015/0039565 A1 | 2/2015 | Lucas |
| 2015/0128274 A1 | 5/2015 | Giokas |
| 2015/0188715 A1 | 7/2015 | Castelluci et al. |
| 2015/0229664 A1 | 8/2015 | Hawthorn et al. |
| 2015/0248563 A1 | 9/2015 | Alfarano et al. |
| 2015/0261847 A1 | 9/2015 | Ducott et al. |
| 2015/0326601 A1 | 11/2015 | Grondin et al. |
| 2016/0004864 A1 | 1/2016 | Falk et al. |
| 2016/0028759 A1 | 1/2016 | Visbal |
| 2016/0132696 A1* | 5/2016 | Vidhani .............. G06F 21/6245 726/28 |
| 2016/0182529 A1* | 6/2016 | Biehl ................... H04L 63/107 726/1 |
| 2016/0292445 A1* | 10/2016 | Lindemann .......... G06F 16/353 |
| 2017/0004314 A1* | 1/2017 | Blumenau ............ G06F 21/335 |
| 2017/0154188 A1* | 6/2017 | Meier .................. G06F 21/6209 |
| 2018/0307859 A1* | 10/2018 | LaFever .............. H04L 63/0407 |
| 2019/0332807 A1* | 10/2019 | LaFever .............. H04L 63/0407 |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| EP | 3188072 | 7/2017 |
| NL | 2011642 | 8/2015 |
| WO | WO 2005/010685 | 2/2005 |

OTHER PUBLICATIONS

Park, Jinhyung D., et al. "Protecting User Privacy: Obfuscating Discriminative Spatio-Temporal Footprints." Proceedings of the 1st ACM SIGSPATIAL Workshop on Recommendations for Location-based Services and Social Networks. p. 2. ACM, 2017. (Year: 2017).*

S. Pearson, "Taking account of privacy when designing cloud computing services," 2009 ICSE Workshop on Software Engineering Challenges of Cloud Computing, Vancouver, BC, 2009, pp. 44-52. (Year: 2009).*

Agrawal et al., "Extending Relational Database Systems to Automatically Enforce Privacy Policies," 21st International Conference on Data Engineering (ICDE'05), 2005, pp. 1013-1022.

Bajaj et al. "TrustedDB: A Trusted Hardware-Based Database with Privacy and Data Confidentiality," IEEE Transactions on Knowledge and Data Engineering, vol. 26, No. 3, pp. 752-765, Mar. 2014.

Litwin et al. "Interoperability of Multiple Autonomous Databases," ACM Computing Surveys (CSUR), 22.3, 1990, pp. 267-293.

Mitra et al., "Privacy-preserving Semantic Interoperation and Access Control of Heterogeneous Databases," Proceedings of the 2006 ACM Symposium on Information, Computer and Communications Security, ACM, 2006, pp. 66-77.

Notice of Allowance for U.S. Appl. No. 15/071,064 dated Oct. 25, 2017.

Notice of Allowance for U.S. Appl. No. 15/071,064 dated Jul. 6, 2017.

Official Communication for U.S. Appl. No. 15/071,064 dated Jun. 16, 2016.

Official Communication for U.S. Appl. No. 15/071,064 dated Sep. 22, 2016.

Official Communication for U.S. Appl. No. 15/071,064 dated Feb. 7, 2017.

Baker et al., "The Development of a Common Enumeration of Vulnerabilities and Exposures," Presented at the Second International Workshop on Recent Advances in Intrusion Detection, Sep. 7-9, 1999, pp. 35.

Bhuyan et al., "Network Anomaly Detection: Methods, Systems and Tools," First Quarter 2014, IEEE, in 34 pages.

Crosby et al., "Efficient Data Structures for Tamper-Evident Logging," Department of Computer Science, Rice University, 2009, pp. 17.

FireEye—Products and Solutions Overview, <http://www.fireeye.com/products-and-solutions> Printed Jun. 30, 2014 in 3 pages.

FireEye, <http://www.fireeye.com/> Printed Jun. 30, 2014 in 2 pages.

Glaab et al., "EnrichNet: Network-Based Gene Set Enrichment Analysis," Bioinformatics 28.18 (2012): pp. i451-i457.

Huang et al., "Systematic and Integrative Analysis of Large Gene Lists Using DAVID Bioinformatics Resources," Nature Protocols, 4.1, 2008, 44-57.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907 Nov. 11, 2000, pp. 49-65.

Ma et al., "A New Approach to Secure Logging," ACM Transactions on Storage, vol. 5, No. 1, Article 2, Published Mar. 2009, 21 pages.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

VirusTotal—About, <http://www.virustotal.com/en/about/> Printed Jun. 30, 2014 in 8 pages.

Waters et al., "Building an Encrypted and Searchable Audit Log," Published Jan. 9, 2004, 11 pages, http://www.parc.com/content/attachments/building_encrypted_searchable_5059_parc.pdf.

Zheng et al., "GOEAST: a web-based software toolkit for Gene Ontology enrichment analysis," Nucleic acids research 36.suppl 2 (2008): pp. W385-W363.

Notice of Allowance for U.S. Appl. No. 14/033,076 dated Mar. 11, 2016.

Notice of Allowance for U.S. Appl. No. 14/223,918 dated Jan. 6, 2016.

Notice of Allowance for U.S. Appl. No. 14/473,860 dated Jan. 5, 2015.

Notice of Allowance for U.S. Appl. No. 14/823,935 dated Apr. 25, 2016.

Notice of Allowance for U.S. Appl. No. 14/970,317 dated May 26, 2016.

Official Communication for European Patent Application No. 14199180.2 dated Jun. 22, 2015.

Official Communication for European Patent Application No. 14199180.2 dated Aug. 31, 2015.

Official Communication for European Patent Application No. 15175106.2 dated Nov. 5, 2015.

Official Communication for European Patent Application No. 15180985.2 dated Jan. 15, 2016.

Official Communication for European Patent Application No. 16207055.1 dated May 26, 2017.

Official Communication for U.S. Appl. No. 14/223,918 dated Jun. 8, 2015.

(56) References Cited

OTHER PUBLICATIONS

Official Communication for U.S. Appl. No. 14/280,490 dated Jul. 24, 2014.
Official Communication for U.S. Appl. No. 14/473,860 dated Nov. 4, 2014.
Official Communication for U.S. Appl. No. 14/479,863 dated Dec. 26, 2014.
Official Communication for U.S. Appl. No. 14/490,612 dated Aug. 18, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/731,312 dated Apr. 14, 2016.
Official Communication for U.S. Appl. No. 14/816,748 dated Apr. 1, 2016.
Official Communication for U.S. Appl. No. 14/816,748 dated May 24, 2016.
Official Communication for U.S. Appl. No. 14/823,935 dated Dec. 4, 2015.
Official Communication for U.S. Appl. No. 14/923,712 dated Feb. 12, 2016.
Official Communication for U.S. Appl. No. 14/970,317 dated Mar. 21, 2016.
Official Communication for U.S. Appl. No. 14/982,699 dated Mar. 25, 2016.
Official Communication for European Patent Application No. 16207055.1 dated Jul. 25, 2018.
Official Communication for European Patent Application No. 19195213.4 dated Nov. 19, 2019.

\* cited by examiner

| 202 | 204 | 206 | 208 | 210 | 212 | 214 |
|---|---|---|---|---|---|---|
| ID | First Name | Last Name | Latitude | Longitude | Telephone | SSN |
| 1 | Mary | Smith | 47.6204 | -122.3491 | 206-555-2100 | 123-45-6789 |
| 2 | James | Johnson | 33.8090 | -117.9190 | 714-555-7277 | 444-44-4444 |
| 3 | Patricia | Williams | 40.7506 | -73.9936 | 202-555-5555 | 222-22-2222 |
| 4 | John | Jones | 41.9483 | -87.6556 | 773-555-2827 | 585-85-8585 |
| 5 | Linda | Brown | 36.0566 | -112.1251 | 928-555-7888 | 789-01-2345 |
| 6 | Robert | Davis | 40.7484 | -73.9857 | 212-555-3100 | 363-63-6363 |
| 7 | Barbara | Miller | 38.8977 | -77.0366 | 202-555-1111 | 111-11-1111 |
| 8 | Michael | Wilson | 33.6828 | -117.8525 | 949-555-0404 | 404-04-0404 |

*Fig. 2*

Minimized Member Data — 300

| ID | First Name | Last Name | Latitude | Longitude | Telephone | SSN |
|----|------------|-----------|----------|-----------|-----------------|----------------|
| 1  | M.         | S——       | 47.62    | -122.35   | 206-555-2100    | ZRn2/a5/MQBJmt |
| 2  | J.         | J——       | 33.81    | -117.92   | 714-555-7277    | Sv7tNYGB7m5Zk  |
| 3  | P.         | W——       | 40.75    | -73.99    | unlisted        | Mq9BnM3XPXFgn  |
| 4  | J.         | J——       | 41.95    | -87.66    | 773-555-2827    | aVfpx3qFU2aBUX |
| 5  | L.         | B——       | 36.06    | -112.13   | 928-555-7888    | tme08pU923UXis |
| 6  | R.         | D——       | 40.75    | -73.99    | unlisted        | yRtx5eV9qGH8C  |
| 7  | B.         | M——       | 38.90    | -77.04    | 202-555-1111    | aYXmhh97aF5Cm  |
| 8  | M.         | W——       | 33.68    | -117.85   | unlisted        | tDTuPiP1qxAHLc |

302 · 304 · 306 · 308 · 310 · 312 · 314

[ Request Original Data ] — 316

*Fig. 3*

SYSTEMS AND METHODS FOR AUTOMATIC AND CUSTOMIZABLE DATA MINIMIZATION OF ELECTRONIC DATA STORES

CROSS-REFERENCE TO RELATED APPLICATIONS

This application is a continuation of U.S. patent application Ser. No. 15/071,064, now U.S. Pat. No. 9,916,465, which is a non-provisional of and claims priority to U.S. Provisional Application No. 62/272,624, which are hereby incorporated by reference in their entirety. This application is related to but does not claim priority from U.S. Pat. No. 8,515,912 entitled "Sharing And Deconflicting Data Changes In A Multimaster Database System" filed Jul. 15, 2010; U.S. Pat. No. 8,527,461 entitled "Cross-ACL Multi-Master Replication" filed Nov. 27, 2012; U.S. Pat. No. 8,688,749 entitled "Cross-Ontology Multi-Master Replication" filed Mar. 31, 2011; U.S. Pat. No. 9,081,975 entitled "Sharing Information Between Nexuses That Use Different Classification Schemes For Information Access Control" filed Oct. 22, 2012; and U.S. Pat. No. 8,838,538 entitled "Techniques for replicating changes to access control lists on investigative analysis data" filed Jul. 31, 2013, each of which are hereby incorporated by reference in their entireties and collectively referred to herein as the "Sharing References."

BACKGROUND

Generally described, electronic data stores can be used to store open and protected information. The information stored in a data store can be entirely open, entirely protected, or may include both open and protected information. Different items of protected information can have varying degrees of privacy associated with them, and may accordingly require more or less effort to maintain the associated degree of privacy.

Access to an electronic data store can be restricted according to the degree of privacy of the information the data store contains. Access can be restricted, for example, by requiring use of logins and passwords to access the data store, or by only permitting access from certain networks or network addresses. Access can be further limited to include only a portion of data store contents, or to grant a particular level of access based on the credentials provided. However, these access controls provide limited flexibility and require significant effort to administer and maintain.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a dynamic data minimization server that may automatically minimize and de-minimize protected information stored in data stores, such as in accordance with privacy settings established by a system administrator. As used herein, minimization refers to the process of encrypting, masking, hashing, generalizing, randomizing, dissociating, de-personalizing, anonymizing, pseudo-anonymizing, and/or otherwise transforming an original item of information into a "minimized item" associated with a higher degree of privacy. As but one example, a masking function may transform the name "John Smith" into "J--- S----," preserving the initials and length of the original item while reducing any association between the minimized item and a particular identity. As a further example, a generalizing function may transform an age of an individual, e.g., 34, into a range of "30-39" to provide some general age information while reducing the level of personally identifiable information in the minimized item. As still further examples, a dissociating function may remove an association between the data items "John Smith" and "1140 E. Main Street," or a generalizing function may minimize "1140 E. Main Street" to "E. Main Street."

As described below, a dynamic data minimization server may be utilized with an existing data store to control access to protected data (either data regarding an individual, a group of individuals, an organization, a business, or other entity) at the level of individual items and requests. In some aspects, the dynamic data minimization server may be utilized to minimize a data store, replacing all or part of the stored protected information with transformed or anonymized data. The dynamic data minimization server may utilize a reverse transformation function, such as a decrypting function that corresponds to a previous encryption function, to fulfill requests for the original protected information (e.g., by a user that has appropriate rights to access the protected data that was originally provided in a minimized form). In other aspects, the dynamic data minimization server may provide minimization services, such that a data store maintains the original data, and requests to access information in the data store are processed via the dynamic data minimization server and minimized on demand. Further aspects of the present disclosure include generation and display of user interfaces for requesting information, displaying items of minimized protected information, and processing requests to access items of de-minimized protected information.

BRIEF DESCRIPTION OF THE DRAWINGS

Reference will now be made to the accompanying drawings, which illustrate example embodiments of the present disclosure. In the drawings:

FIG. 2 is a block diagram of an example data table containing items of open and protected information, in accordance with aspects of the present disclosure;

FIG. 3 is a block diagram of an example user interface presenting items of minimized information in accordance with aspects of the present disclosure.

DETAILED DESCRIPTION

Figure 1:
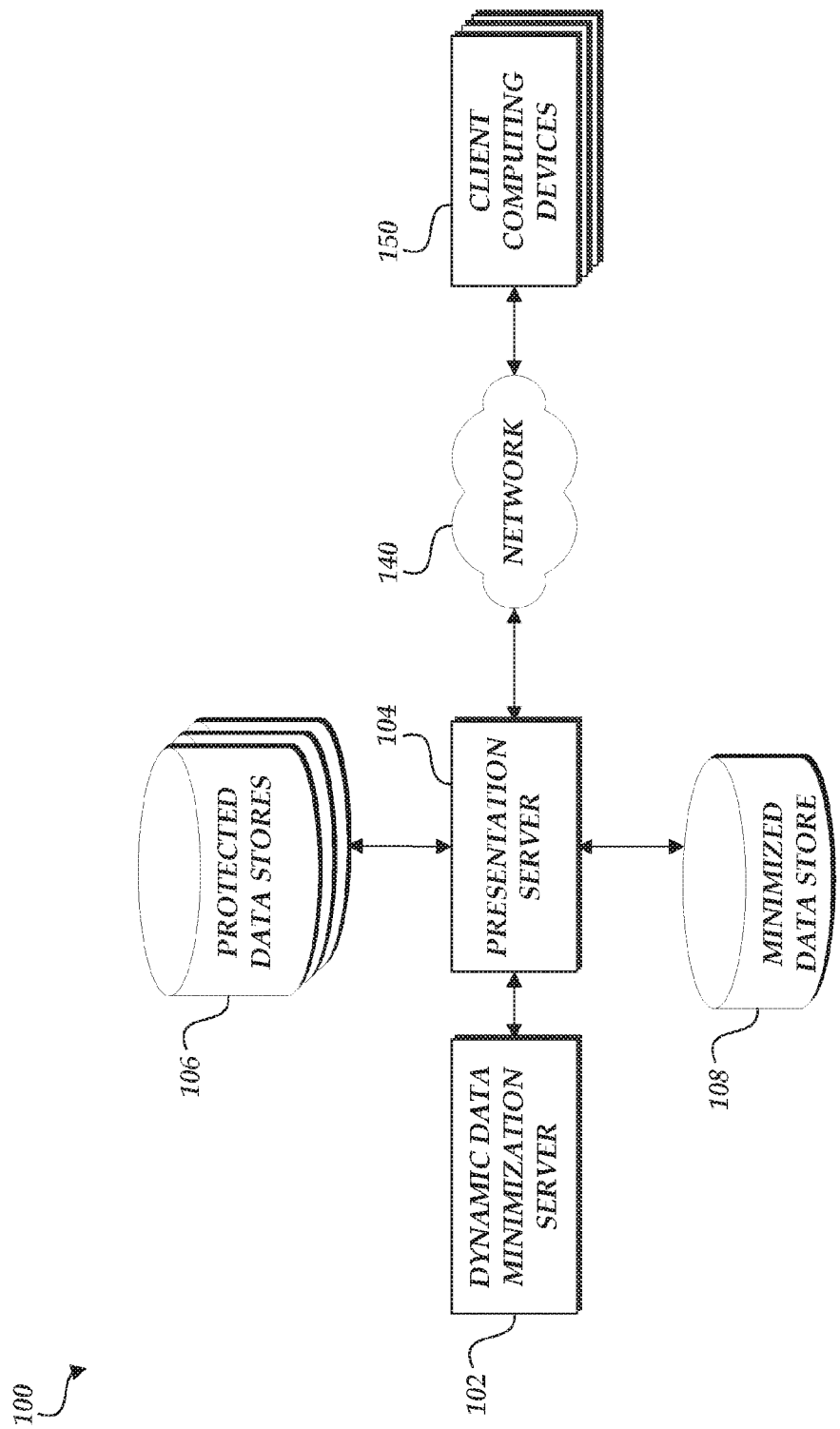
FIG. 1 is a schematic block diagram of an example network topology including a dynamic data minimization server, protected data stores, a minimized data store, and a presentation server in communication with client computing devices via a network.

Reference will now be made in detail to example embodiments, the examples of which are illustrated in the accompanying drawings. Whenever possible, the same reference numbers will be used throughout the drawings to refer to the same or like parts.

Embodiments describe methods, systems, and non-transitory computer-readable mediums for minimizing protected information and processing requests to access de-minimized protected information. The embodiments described herein may be applied to existing data sources, with or without modification to the original source data, and may be used to create, customize, and persist minimization settings on a per-request and/or per-item basis. Items of protected information may be minimized to support, for example, privacy policies, data minimization policies, legal requirements, or other conditions, and may be accessed or de-minimized in accordance with access policies.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Protected data is any information regarding a particular entity, such as an individual, a group of individuals, an organization, a business, or any other entity or combination of the aforementioned entities, that is desirable to be kept private or concealed, such as personal, sensitive, and/or confidential information. In some implementations, protected data includes any personally identifiable information ("PII") that could potentially be used to identify a specific individual or to distinguish one individual from another.

Open data is any information regarding a particular entity that is not protected data, such as publicly available data.

Minimization process (function or transformation), refers to any process of anonymizing, encrypting, masking, hashing, generalizing, randomizing, dissociating, de-personalizing, and/or otherwise transforming an item of protected data (or a "protected data item") into a "minimized data item" associated with a higher degree of privacy and/or that is less indicative of a particular entity.

A reversible minimization process (function or transformation) can be applied to a minimized data item to recover (or regenerate) the original protected data. A reversible minimization process can only be applied to protected data that is minimized using a reversible minimization process.

Access rights are rights of a requesting entity, such as a requesting individual, group of individuals, organization, business, or any other entity, to access protected data. Access rights may be based rights of the requesting entity and/or characteristics of the requested data. For example, data items may have varying metadata that are usable to determine access rights of requesting entities. In some embodiments, an access control list (ACL) may be accessed to determine rights of a requesting entity to view protected data.

Example Access Control

An ACL is a set of one or more permissions that govern use (e.g., read access, write access, etc.) of the associated access-controlled (e.g., protected) data. A permission in an ACL may be expressed in a variety of different forms in various embodiments. For example, a permission may specify a set of one or more trustees (e.g., a user) and one or more use rights (e.g., read access, write access, etc.) of those trustees with respect to the associated data item. As another example, a permission may specify a minimum security classification level (e.g., unclassified, secret, top secret, or a particular job title or position) such that only users that possess the minimum security classification level can use (e.g., read, write, etc.) the associated protected data item. In other embodiments, other forms for expressing an ACL permission may be used. As discussed herein, the permissions data associated with particular data items of various types may be used to determine minimization processes to perform on protected data items in order to provide some form of information to the requesting entity, while reducing personally identifiable information provided. In some embodiments, an ACL may be generated or managed as illustrated by the Sharing References.

Example System Overview

FIG. 1 is a block diagram of an example network topology 100 for processing requests to minimize and de-minimize (which may include a process of re-identification, reverse anonymization, and/or other process) protected data in accordance with the present disclosure. In the illustrated embodiment, the network topology 100 includes a dynamic data minimization server 102 in communication with a presentation server 104. In various embodiments, the dynamic data minimization server 102 may correspond to a wide variety of computing devices configured to implement aspects of the present disclosure. For example, the dynamic data minimization server 102 can include one or more computing devices (e.g., server(s)), memory storing data and/or software instructions (e.g., database(s), memory device(s), etc.), and other known computing components. According to some embodiments, the dynamic data minimization server 102 can include one or more networked computers that execute processing in parallel or use a distributed computing architecture. The dynamic data minimization server 102 can be configured to communicate with one or more components of the network topology 100, and it can be configured to provide information via an interface(s) accessible by users over a network (e.g., the Internet). In some embodiments, the dynamic data minimization server 102 can include an application server configured to provide data to one or more presentation servers 104 executing on computing systems connected to the dynamic data minimization server 102.

The presentation server 104 may similarly correspond to a wide variety of computing devices configured to implement aspects of the present disclosure. The example topology in FIG. 1 is not limiting, and various configurations of the dynamic data minimization server 102 and presentation server 104 are within the scope of the present disclosure. For example, the dynamic data minimization server 102 and presentation server 104 may be implemented as a single computing device, as one or more virtual computing devices, or as various combinations of physical and virtual computing devices and computer-executable instructions.

In the illustrated example, the presentation server 104 is in communication with one or more protected data stores 106, which store protected data and may additionally store open data. Generally, a protected data store 106 may correspond to a hard disk drive, network accessible storage, or any other type of perpetual or substantially perpetual storage accessible by the presentation server 104. For example, the protected data stores 106 of FIG. 1 may correspond to network accessible storage devices. Though depicted as external to the presentation server 104, in some embodiments, protected data stores 106 may be internal to the presentation server 104. Further, in some embodiments, the protected data stores 106 may be internal to the dynamic data minimization server 102, may be in communication with the anonymization server 102 instead of (or in addition to) the presentation server 104, and may be in communication with the presentation server 104 via the dynamic data minimization server 102.

In some embodiments, the presentation server 104 is in communication with a minimized data store 108. Generally, a minimized data store 108 may correspond to a hard disk drive, network accessible storage, or any other type of perpetual or substantially perpetual storage accessible by the presentation server 104. For example, the minimized data store 108 of FIG. 1 may correspond to a network accessible storage device. Though depicted as external to the presentation server 104, in some embodiments, the minimized data store 108 may be internal to the presentation server 104. Further, in some embodiments, the minimized data store 108 may be internal to the dynamic data minimization server 102, may be in communication with the dynamic data minimization server 102 instead of (or in addition to) the presentation server 104, and may be in communication with the presentation server 104 via the dynamic data minimization server 102. Further, in some embodiments, the minimized data store 108 may be omitted or combined with one or more protected data stores 106.

The network topology 100 further includes a network 140 operable to enable communication between the presentation server 104 and the client computing device 150. The network 120 may be, for instance, a wide area network (WAN), a local area network (LAN), or a global communications network. In some embodiments, the dynamic data minimization server 102, presentation server 104, protected data stores 106, or minimized data store 108 may communicate via the network 120 or via a separate network, such as a private LAN.

The modules or components illustrated in FIG. 1 may include additional components, systems, and subsystems for facilitating the methods and processes. For example, in various embodiments, the dynamic data minimization server 102, presentation server 104, protected data stores 106, and minimized data store 108 may be centralized in one computing device, distributed across several computing devices, implemented by one or more virtual machine instances, and/or distributed through a network.

Example Data Structure

FIG. 2 is a block diagram of an example data set 200 that contains items of protected information, in accordance with aspects of the present disclosure. The example data set 200 may be stored, for example, in a data store, such as a protected data store 106 of FIG. 1. In the illustrated example, data set 200 includes record identifier 202, first name 204, last name 206, latitude 208, longitude 210, telephone number 212, and Social Security Number (SSN) 214. Data set 200 is provided as an example, and the present disclosure is applicable to any data set containing protected information. As non-limiting examples, data set 200 may contain medical records, health information, financial records, billing records, credit card information, or other confidential data. In some embodiments, data set 200 may contain data subject to privacy laws, such as the Health Insurance Portability and Accountability Act (HIPAA) or the Data Protection Directive, may contain data subject to legally mandated internal controls, such as the Sarbanes-Oxley Act, or may contain data controlled by privacy policies, data minimization policies, or other policies that restrict access to all or part of the data set 200. Further, in some embodiments, individual items of information may be protected while other items of the same type are open, and items of information may be accessible by requesting entities based on characteristics of the particular requesting entity. Thus, a first requesting entity may have rights to view all protected information of a first entity, while a second requesting entity may only have rights to view a minimized version of the protected information (such as by applying one or more minimization processes to portions of the protected information). As a non-limiting example, some telephone numbers 212 may be unlisted or otherwise have greater privacy requirements than others.

With reference now to FIG. 3, an example user interface 300 for presentation of minimized data will be described. In the illustrated example, the minimized data presented in FIG. 3 corresponds to the data set 200 of FIG. 2. FIG. 3 depicts a simplified interface for purposes of illustration, and in various embodiments, user interface 300 may have more or fewer components within the scope of the present disclosure. As non-limiting examples, user interface 300 may be implemented as a web page displayed via a web browser, or as an application executing on a tablet, mobile, or other computing device. Additionally, in some embodiments, the minimized data in FIG. 3 may be provided via an application programming interface (API) rather than an interface generated for display.

In the example of FIG. 3, various transformation functions have been applied to elements of data set 200 as examples of minimized protected information. As an example of open information that has not been minimized, record identifier 202 (FIG. 2) has not been transformed and is displayed without transformation in the first column 302.

Column 304 contains minimized information corresponding to the first name 204 of FIG. 2. A transformation function has been applied to the first name data, truncating the data at the first initial and replacing the remaining characters with a period (".") to indicate that the information has been abbreviated. In column 306, a masking transformation function has been applied to the last name 206, replacing all characters after the initial with a dash. These example masking transformations, as well as certain other minimization processes discussed herein, preserve the character length of the last name data items (or other data items), allowing some analyses to be performed while limiting access to the underlying member names. As a non-limiting example, an analysis may be performed on the minimized last names to determine whether a particular input field length (e.g., an input field that accepts up to 20 characters) will be suitable for input of last names.

Columns 308 and 310 present transformed latitude and longitude information corresponding to the latitude 208 and longitude 210 in data set 200. For these columns, an example transformation function has been applied that reduces the number of significant digits in the latitude or longitude information. The minimized data may thus be analyzed to determine, e.g., customer addresses within a general area, such as a city or region, without revealing exact locations. In some embodiments, user interface 300 may include a map display that presents imprecise geolocation data as a range, circle, heat map, or other indicator of potential geolocations. In further embodiments not depicted in FIG. 3, data such as a street address may be transformed into a latitude-longitude pair and then further transformed to minimize the precise location.

In Column 312, a transformation function has been applied to a subset of records within the data set 200, replacing some of the telephone numbers 212 with the string "unlisted." In some embodiments, data set 200 may contain a field that indicates whether a telephone number 212 is unlisted, and the transformation function may transform the telephone number 212 based on the contents of that field. Further, in some embodiments, the data set 200 may include user privacy preferences that indicate whether to minimize particular items of information, such as a particular user's address or telephone number.

In Column 314, an encrypting transformation function has been applied to the SSNs 214 of data set 200. The encrypting transformation function is an example of a reversible transformation function. A reversible transformation function has a corresponding reverse transformation function, such as a decrypting transformation function, that can be applied to the presented minimized data to recover the original protected data. A reversible transformation may be used to further restrict access to the original protected data. For example, in some embodiments, the presentation server 104 of FIG. 1 may interact only with a minimized data store 108, and may not have access to the original item of protected data in the protected data store 106. The presentation server 104 may nonetheless present the original item by requesting that the dynamic data minimization server 102 de-minimize an item of encrypted data, and the dynamic data minimization server 102 may in turn apply the reverse transformation function to produce the de-minimized item. In some embodiments, the presentation server 104 may omit presentation of transformed data in the user interface 300, but may retain the transformed data and utilize it when processing de-minimization requests. Further examples of reversible transformation functions include hashing transformation functions, ciphering transformation functions, and other functions producing a result that can be utilized to obtain the original data.

Button 316 may be used to generate a request to provide protected data corresponding to the minimized data presented in the user interface 300. In some embodiments, a separate button 316 may be provided for each column of minimized items, or for individual rows of data. Any other suitable user interface element or elements may be used to obtain requests to de-minimize the data or provide the original protected data.

The transformation functions described with regard to FIG. 3 represent only a subset of the transformation functions within the scope of the present disclosure. For example, a transformation function may add random "noise" to a quantifiable item of protected data, in a manner that preserves the general characteristics of the data set 200 for analysis but does not allow identification of any particular item of protected data. As a further example, a transformation function may transform items of protected data into ranges or "buckets," such that precise salary information is replaced by ranges such as "$50,000 to $59,999," "$60,000 to $69,999," and so forth. As a still further example, a transformation function may identify an association between two data fields, such as names and birthdates, and may dissociate the fields such that names and birthdates from the data set 200 are randomly paired. The example transformation functions provided herein are thus understood to be not limiting.

Figure 4A:
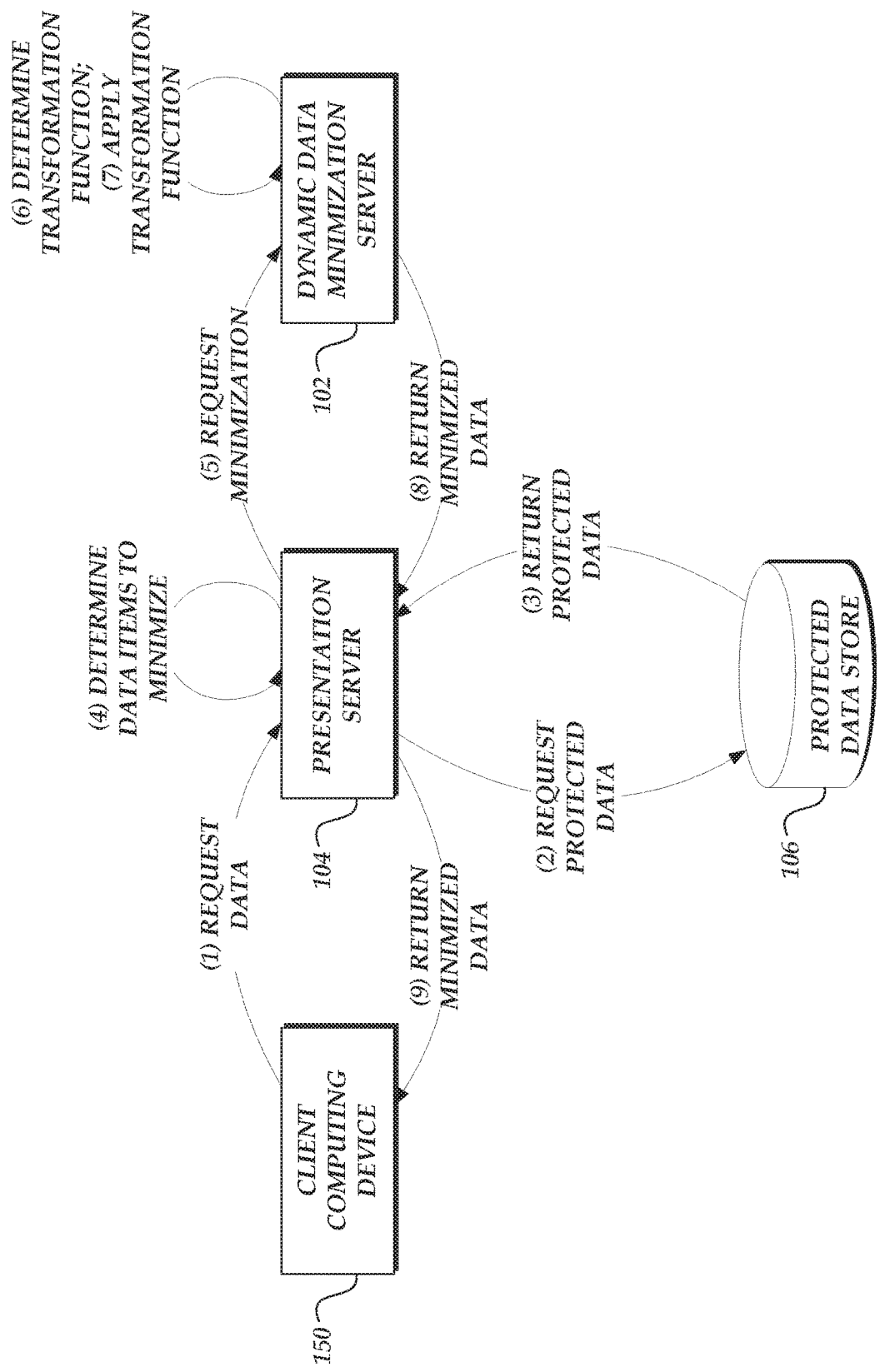
FIGS. 4A and 4B are example block diagrams depicting on-demand minimization of protected information and processing of requests to access the original protected information, in accordance with aspects of the present disclosure.
Figure 4B:
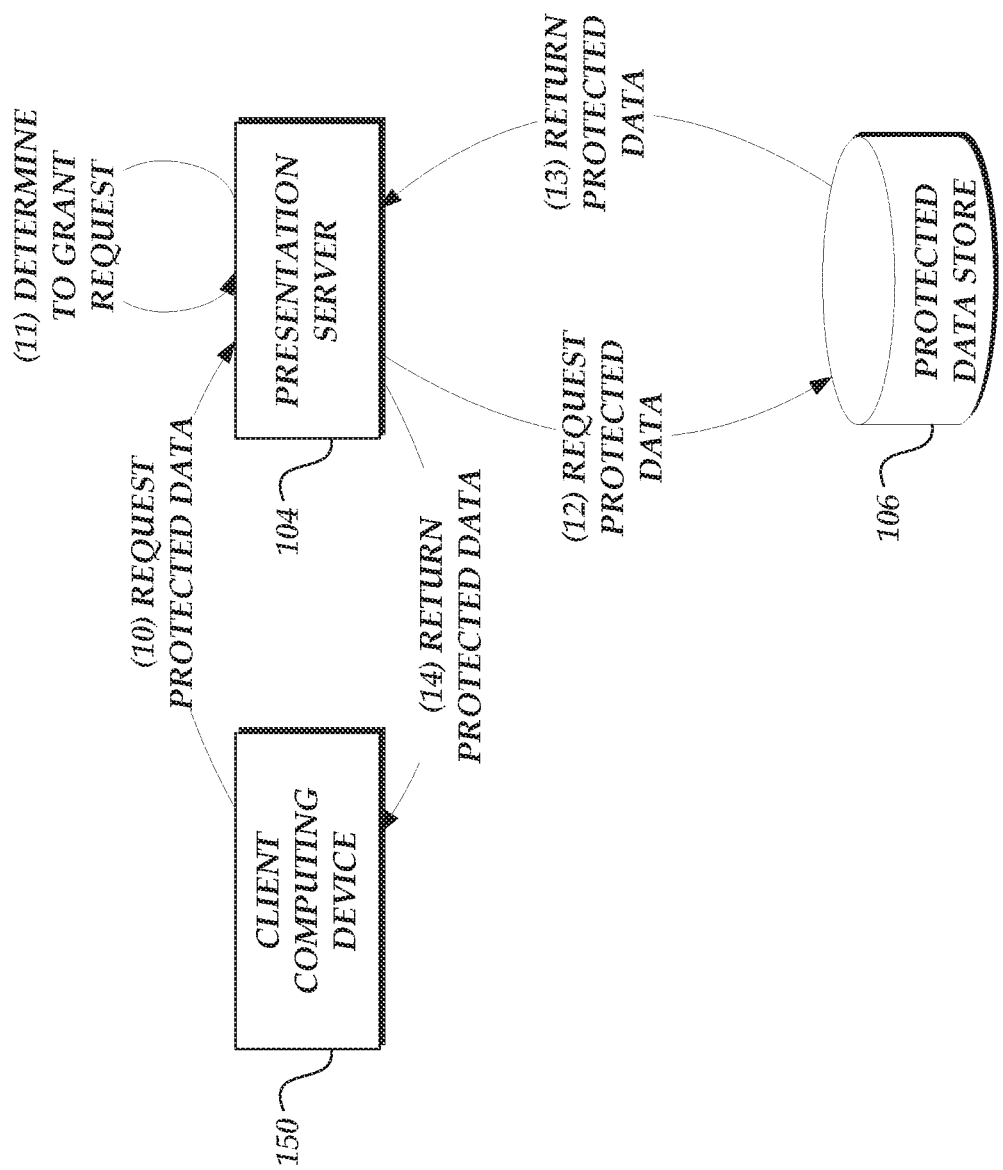

FIGS. 4A and 4B are block diagrams of the network topology of FIG. 1 illustrating processing of requests to minimize and provide protected data in accordance with aspects of the present disclosure. With reference now to FIG. 4A, at (1), a client computing device 150 may transmit a request for data. Illustratively, the request may seek data without regard to whether the requesting entity (e.g., a requesting user or user group) has appropriate rights to view protected information in the requested data and/or needs to have all of the protected information displayed in order to preserve privacy rights of individuals (e.g., such as in a healthcare environment).

At (2), the presentation server 104 retrieves the data, including one or more items of protected information, from one or more protected data stores 106, which returns the requested data at (3). At (4), the presentation server determines whether and which of the requested data items will be minimized. Illustratively, the set of data items to minimize may be determined based on rules or other criteria set up by an administrator of the protected data store 106, by a supervisor or administrator of the requesting entity, and/or automatically by the system, such as based on default rules. For example, minimization rules may specify that certain types of data, such as names, addresses, telephone numbers, and the like, are to be minimized when data is initially requested. The minimization rules may further specify permissions to grant or deny to requesting entities with various access rights. For example, a rule may specify that requesting entities with certain access rights will receive minimized names and telephone numbers, will be granted permission in response to a request to de-minimize names, and will be denied permission in response to a request to de-minimize telephone numbers. "Access rights" or "access levels," as used herein, shall be understood to include such permissions.

In some embodiments, the presentation server 104 may determine an access level associated with the request, or (as described above) may obtain the access level with the request. In these embodiments the presentation server 104 may determine whether to fulfill the request, whether to minimize items of protected information, or which items of protected information to minimize, based on the determined access level. For example, the presentation server 104 may determine that a request corresponds to a particular stage of an investigation, and accordingly determine which items of protected information should be minimized in the response, and particular minimization processes to apply to each type of data items and/or particular data items. For example, minimization rules may indicate a first type of minimization (e.g., encrypting) is to be applied to a first data items of a first type (e.g., Social Security Numbers) in a set of requested data requested by a particular user, while determining that a second type of minimization (e.g., masking all but a first character) of second data items of a second type (e.g. last name) is applied to the set of requested data. Thus, minimization methods may be customized for different types of data within a particular data set. Furthermore, even within data items of a particular type in a data set (e.g., a list of 50 telephone numbers in a data set including information on 50 individuals), the minimization process selected for a particular data item (e.g., one phone number of the 50) may be different than the general minimization process selected from the remaining data items of that type (e.g., the other 49 phone numbers and have the last 7 digits randomized based on a minimization rule set by an organization that is accessing the data). For example, the one phone number may have special permissions associated with it (or the entire individual data record associated with it), such as in an access control list, that indicates a higher or lower level of minimization. For example, the permissions associated with that data item may indicate that it is top secret and, thus, all digits of the phone number may be randomized (or minimized by some other method). Accordingly, minimization processes applied to data items may be customized extensively to requested data sets based on many factors in order to provide an optimal level of de-personalization of data items within the returned data set, such as to meet or exceed privacy requirements associated with the data set.

In some embodiments, the interaction at (4) may be carried out prior to the interactions at (2) and (3). That is, the presentation server may determine whether and how to fulfill the request prior to retrieving the requested data from the protected data store 106.

At (5), the presentation server 104 requests minimization of some or all of the items of protected data retrieved at (3). Thereafter, at (6), the dynamic data minimization server 102 determines the transformation function to use for a particular item of protected information. Illustratively, the dynamic data minimization server 102 may determine the transformation function based on the particular item of protected information, the access level, other content of the request, or other information. For example, the dynamic data minimization server 102 may determine that a credit card number must always be encrypted, or that a request associated with a higher level of access corresponds to a function that provides a lower amount of transformation.

At (7), the dynamic data minimization server 102 applies the determined transformation function to the item of protected information to produce an item of minimized information. For example, as described above with reference to FIG. 3, the minimization server may transform the surname "Smith" into "S." by truncating the name after the first character and appending a period, apply a hashing function to transform a Social Security Number into an encrypted hash, or perform other transformations as described above.

At (8), the dynamic data minimization server 102 returns items of minimized information corresponding to the request at (5). Thereafter, at (9), the presentation server generates and outputs a user interface including the minimized data, as described above.

In some embodiments, information stored in the protected data store 106 may already be minimized. For example, the protected data store 106 may store passwords, SSNs, or credit card numbers in encrypted formats to further secure these data in the event of a breach. The information returned at (3) may thus already be transformed. In these embodiments, the presentation server at (4) may determine whether the data should be de-minimized, and may request de-minimization of the data rather than minimization. De-minimization is described in more detail below with reference to FIG. 5B.

Turning now to FIG. 4B, at (10), the client computing device may transmit a request for protected data corresponding to some or all of the minimized data received at (9). Illustratively, the request may be transmitted via the user interface 300 depicted in FIG. 3. At (11), the presentation server 104 determines whether to grant the request. The presentation server 104 may determine that all, part, or none of the request should be granted. In some embodiments, the determination may be based on the access level associated with the request at (1), or an access level may be determined or obtained corresponding to the request at (9).

In embodiments where all or part of the request is granted, at (12), the presentation server 104 requests the protected data from the protected data store 106, which returns the protected data at (13). At (14), the presentation server 104 generates and outputs a user interface for display of the protected data to which access has been granted. In some embodiments the presentation server 104 may retain the protected data retrieved at (3), in which case the interactions at (11) and (12) may be omitted and the presentation server 104 fulfills the request without further data retrieval.

Figure 5A:
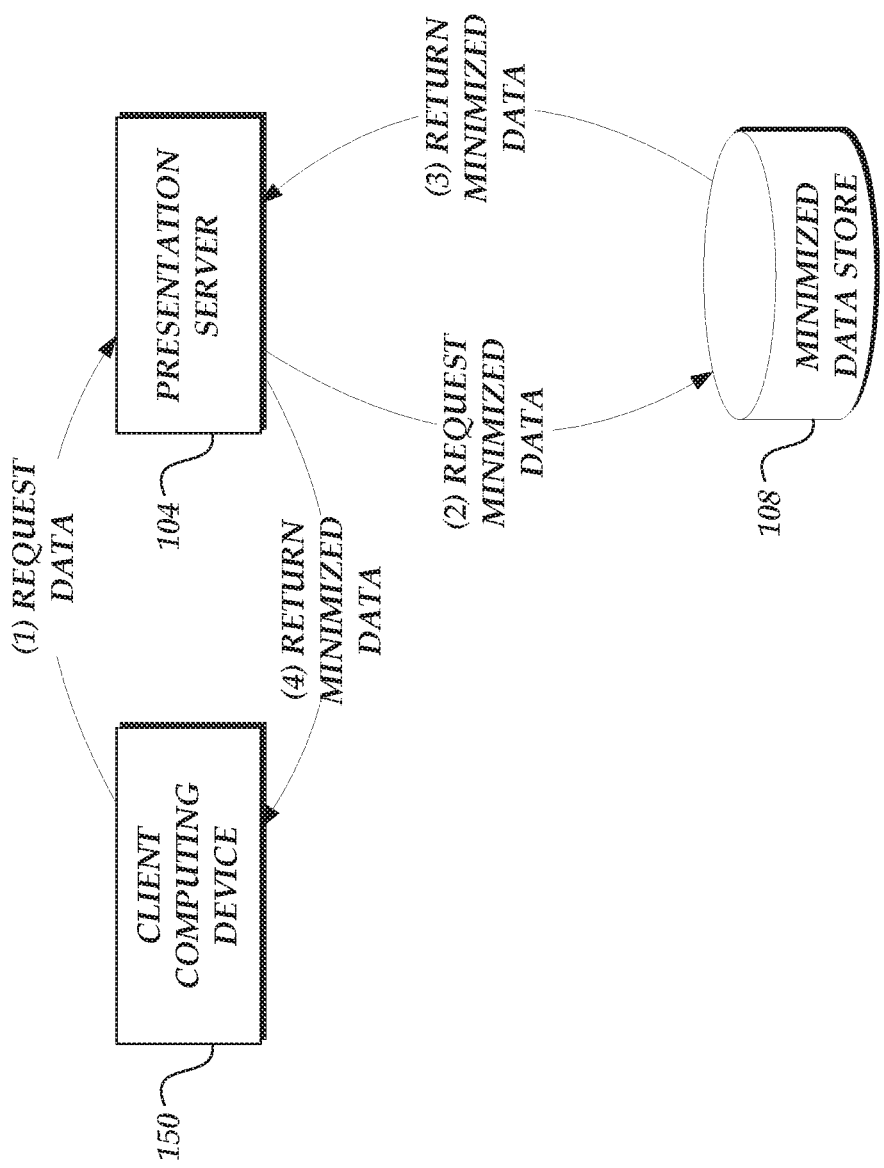
FIGS. 5A and 5B are example block diagrams depicting at-rest minimization of protected information and processing of requests to de-minimize protected information, in accordance with aspects of the present disclosure.
Figure 5B:
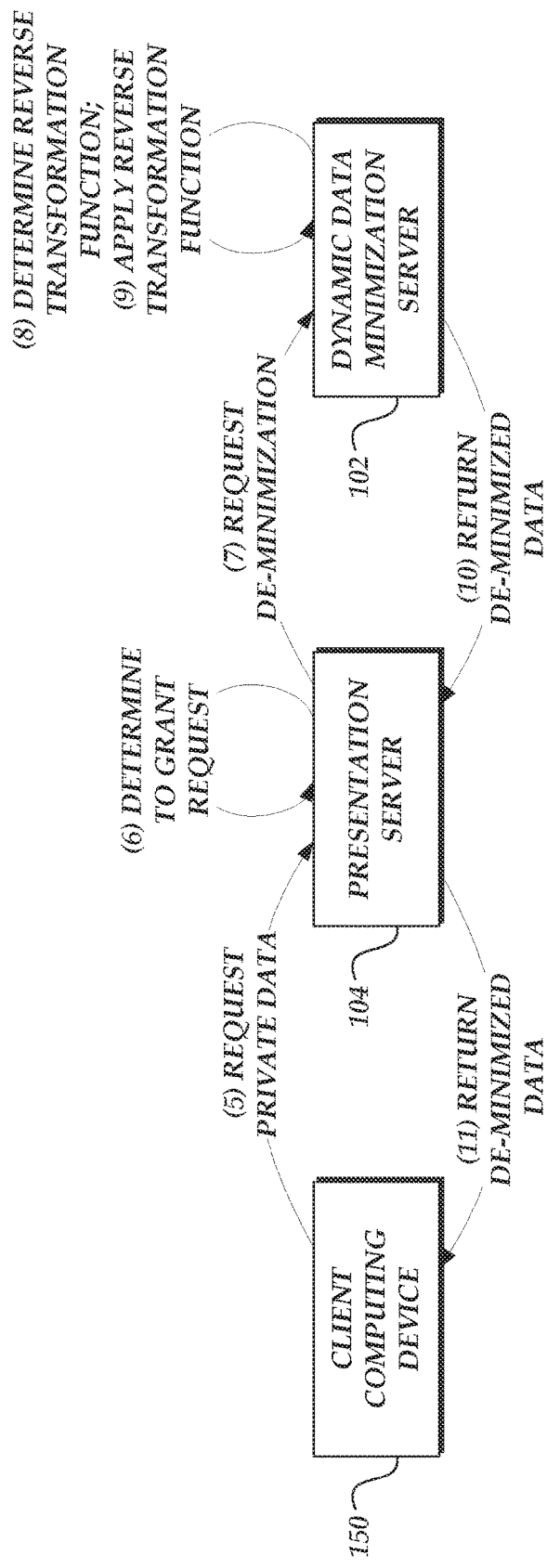

FIGS. 5A and 5B are block diagrams of the network topology of FIG. 1 illustrating processing of requests to minimize and de-minimize protected data in accordance with alternative embodiments of the present disclosure. With reference now to FIG. 5A, at (1), a client computing device 150 transmits a request for data in similar fashion to that described with reference to FIG. 4A. In the embodiment illustrated in FIG. 5A, however, the presentation server 104 at (2) requests minimized data from an minimized data store 108 in order to fulfill the request at (1). At (3), the minimized data store 108 returns the request, and at (4) the presentation server 104 generates and outputs a user interface, such as the user interface 300 of FIG. 3, for display of the minimized data.

Turning now to FIG. 5B, at (5), the client computing device 150 transmits a request to access the protected data corresponding to the minimized data presented at (4). At (6), the presentation server 104 determines whether to grant the request, in similar fashion to the determination described above with reference to FIG. 4B. In embodiments where the presentation server 104 determines to grant the request, at (7) the presentation server 104 requests that the minimization server 102 de-anonymize the requested data.

At (8), the dynamic data minimization server 102 determines a reverse transformation function. Illustratively, the dynamic data minimization server 102 may maintain a log or transaction history of the transformation functions used to minimize data in the minimized data store 108, and may identify a reverse transformation function based on the function originally used to transform the protected data. In some embodiments, information regarding transformation functions or reverse transformation functions may be stored in the minimized data store 108, and the presentation server 104 may retrieve and provide this information with the de-minimization request.

At (9), the dynamic data minimization server 102 applies the reverse transformation function to the minimized data to produce de-minimized data, which it provides to the presentation server 104 at (10). At (11), the presentation server 104 generates and outputs a user interface to display the de-minimized data.

Variations on the interactions depicted in FIGS. 4A-5B are within the scope of the present disclosure. For example, in some embodiments, the dynamic data minimization server 102 may interact directly with protected data stores 106 or the minimized data store 108, and the presentation server 104 may instead request data via the dynamic data minimization server 102. As a further example, although not depicted in FIGS. 4A-5B, the dynamic data minimization server 102 may be utilized to transform a protected data store 106 into a minimized data store 108 in accordance with aspects of the present disclosure, or may be utilized when transforming protected data for storage in the minimized data store 108.

In further embodiments, the presentation server 104 may determine whether or which protected data items to minimize based on previous requests for the protected data items. For example, the presentation server 104 may maintain a history of de-minimization requests, and may determine that a request for a particular set of data items is frequently followed by a request to de-minimize a particular protected item in the set. The presentation server 104 may thus determine that the particular protected item should not be minimized when fulfilling requests for the set of data items. As a further example, the presentation server 104 may determine that minimizing a particular protected data item seldom results in a request to provide the original protected data, and accordingly that the protected data item may be minimized for a broader set of access levels. In further embodiments, the dynamic data minimization server 102 may determine a transformation function based on an access level associated with the request. For example, the dynamic data minimization server 102 may apply a masking function that masks location information entirely, or may apply a transformation function that reduces the precision of location information, depending on the access level.

Figure 6:
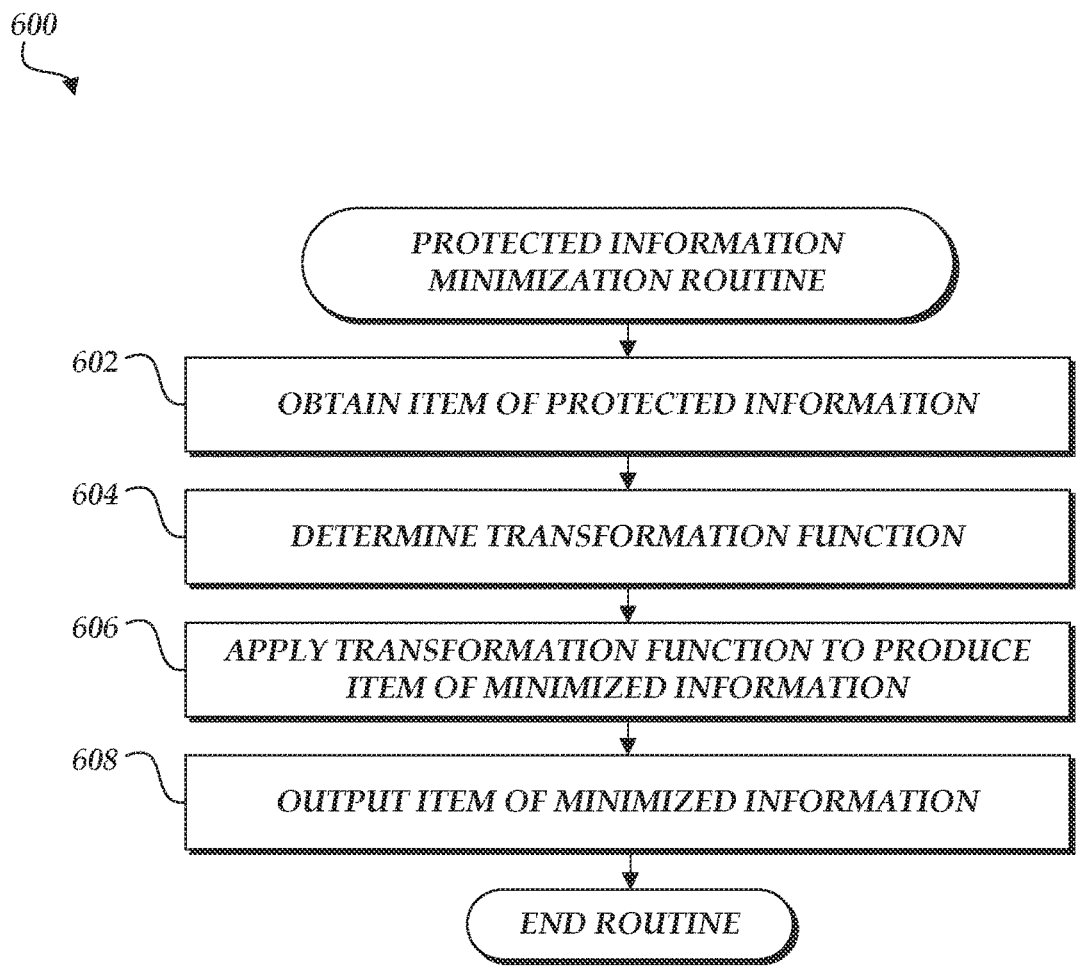
FIG. 6 is a flow diagram depicting an example routine for minimizing protected information in accordance with aspects of the present disclosure.

With reference now to FIG. 6, an example routine 600 for minimizing an item of protected information will be described. The routine 600 may be carried out, for example, by the dynamic data minimization server 102 of FIG. 1. At block 602, an item of protected information may be obtained. For example, the item of protected information may be obtained as part of a request to minimize the item of protected information, or as part of a request to write the item to a minimized data store.

At block 604, a transformation function may be determined. The transformation function may be determined based on characteristics of the item of protected information. For example, an item of protected information may be quantifiable, such as a glucose level, a test score, an annual income, or a clothing size. A transformation function may thus be determined that reduces the precision or accuracy of the quantification. In some embodiments, a transformation function may be determined based on an access level, as described above, or based on a degree of privacy associated with the item of protected information. For example, an encryption or hashing function may be determined for an item of protected information such as a Social Security number or a credit card number. In further embodiments, a reversible transformation function may be determined.

At block 606, the transformation function may be applied to the item of protected information to produce in item of minimized information. In some embodiments, multiple items of protected information may be obtained at block 602, and blocks 604 and 606 may be carried out iteratively to determine and apply a number of transformation functions.

At block 608, the item or items of minimized information may be output. In some embodiments, the transformation function or an identifier corresponding to the function may be output to enable subsequent reverse transformations, or the applied transformation function may be logged to a data store.

Figure 7:
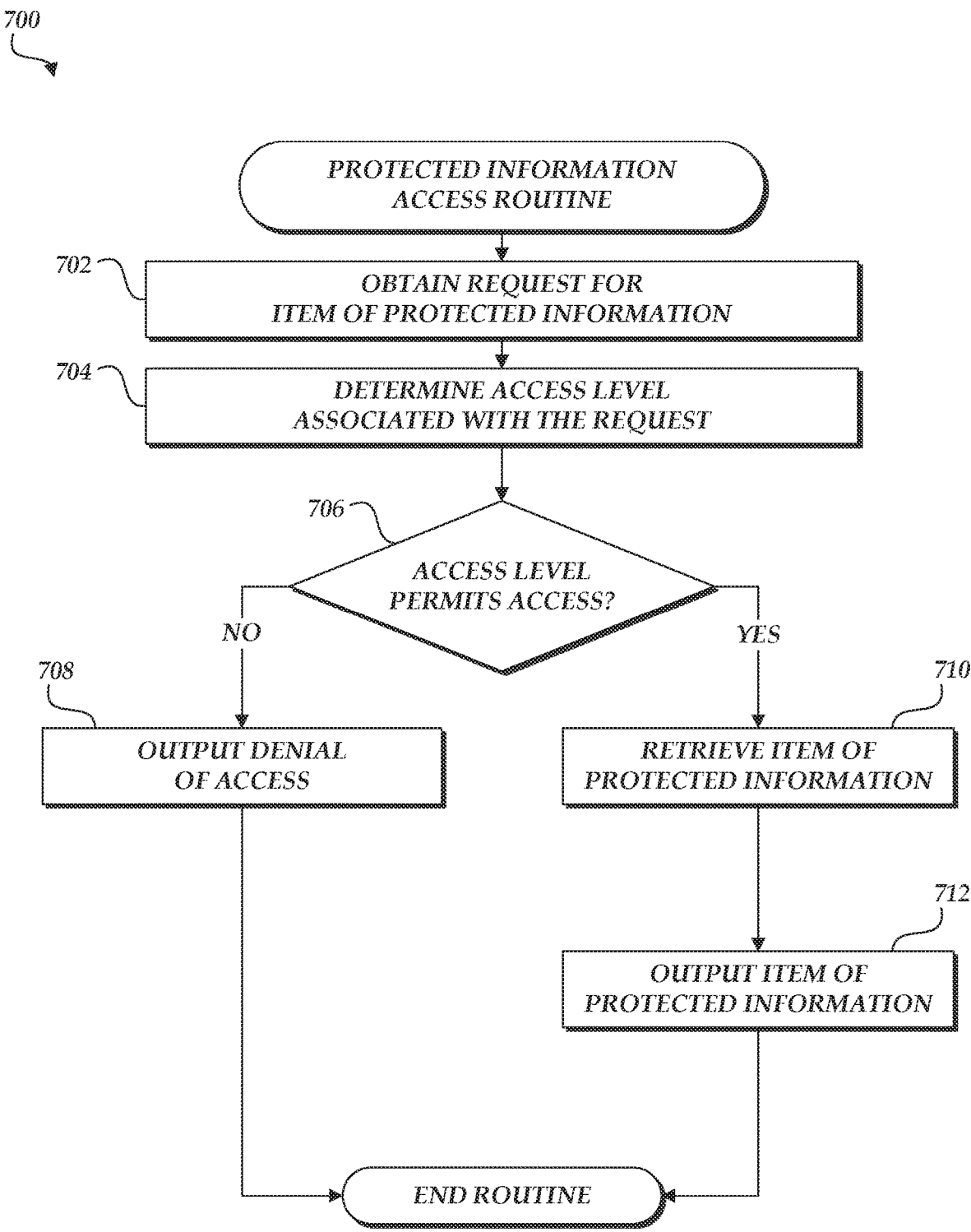
FIG. 7 is a flow diagram depicting an example routine for processing requests to access protected information, in accordance with aspects of the present disclosure.

With reference now to FIG. 7, an example of a routine 700 for accessing an item of protected information that corresponds to an item of minimized information will be described. The routine 700 may be carried out, for example, by the presentation server 104 of FIG. 1. In some embodiments, blocks of the routine 700 may instead be carried out by the dynamic data minimization server 102.

At block 702, a request to access an item of protected information may be obtained. The request may provide an item of minimized information or an identifier corresponding to an item of minimized information, and may further provide an access level, password, or other identifier used to validate the request.

At block 704, an access level associated with the request may be determined. In embodiments where the request provides an access level, the access level in the request may be validated. In other embodiments, the access level may be determined based on, for example, the source of the request, the content of the request, a history of previous requests, the item of protected data being requested, or other factors or combinations of factors.

At decision block 706, a determination is made as to whether the access level associated with the request permits access to the item of protected information. As described above, the determination may be made based on various rules or preferences specified by the provider of the item of protected information or by an administrator of the requesting entity, for example. The rules may further be customized based on criteria such as role or job title, security clearance level, connection type (e.g., a request to access protected information may be denied if it originates from a mobile device or an insecure network), physical location (e.g., a request to de-minimize health records may only be granted within the hospital), or other factors. If the determination is made that the request should not be granted, the routine 700 branches to block 708, where output may be provided indicating that request has been denied, and thereafter the routine ends. In some embodiments, block 708 may be omitted and the routine 700 may silently end without providing output. If the determination is that the request should be granted, then at block 710 the corresponding item of protected information may be obtained. Illustratively, the item of protected information may be retrieved from a protected data store 106, or from a previous retrieval of data from the protected data store 106. At block 712, the item of protected information may be output in response to the request, and thereafter the routine ends.

FIG. 7 is provided as an example, and that the present disclosure includes various combinations or variations in addition to the non-limiting example of routine 700. For example, in some embodiments, a determination may be made that the access level does not permit access to the item of protected information, but does permit access to an item of minimized information that was minimized by a different transformation function. The item of less minimized information may thus be retrieved or generated and provided in response to the request. In further embodiments, a user interface may be generated for display that includes the item of protected information as well as other open or minimized data.

Figure 8:
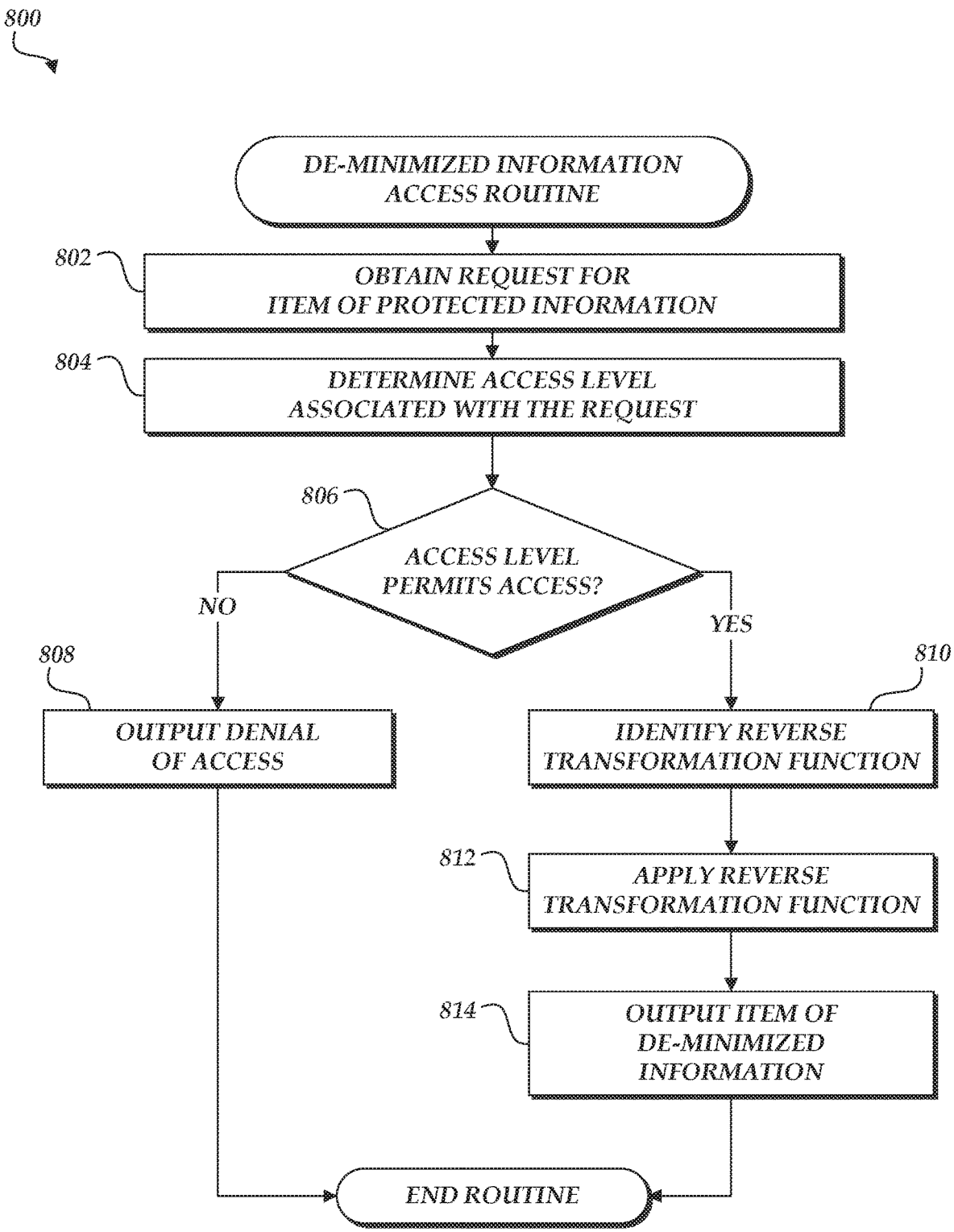
FIG. 8 is a flow diagram depicting an example routine for processing requests to de-minimize protected information, in accordance with aspects of the present disclosure.

With reference now to FIG. 8, an example of a routine 800 for de-minimizing an item of minimized information will be described. The de-minimizing routine 800 may be carried out, for example, by the dynamic data minimization server 102 of FIG. 1.

At block 802, a request for an item of protected information may be obtained. The request may provide an item of minimized data to be de-minimized, or may request an item of protected information without specifying how it is produced. In some embodiments, the request may provide a transformation function or an identifier that identifies the function used to produce the item of minimized data. The request may further provide an access level or other information used to determine whether the request should be granted.

At block 804, an access level associated with the request may be determined. In embodiments where the request provides an access level, the access level in the request may be validated. In other embodiments, the access level may be determined based on, for example, the source of the request, the content of the request, a history of previous requests, the item of protected data being requested, or other factors or combinations of factors.

At decision block 806, a determination is made as to whether the access level associated with the request permits access to the item of protected information. If not, the routine 800 branches to block 808, where output may be provided indicating that request has been denied, and thereafter the routine ends. In some embodiments, block 808 may be omitted and the routine 800 may silently end without providing output.

If the determination at decision block 806 is that the request should be granted, then at block 810 a reverse transformation function may be identified. Illustratively, the reverse transformation function may be identified based on a transformation function used to produce an item of minimized information associated with the request. The transformation function may be obtained, for example, from the request, from a log of minimization requests, or by analyzing the item of minimized information.

At block 812, the reverse transformation function may be applied to produce an item of de-minimized information, which corresponds to the item of protected information originally used to produce the item of minimized information. At block 814, the item of protected information may be output in response to the request, and thereafter the routine ends.

Example System Components

Figure 9:
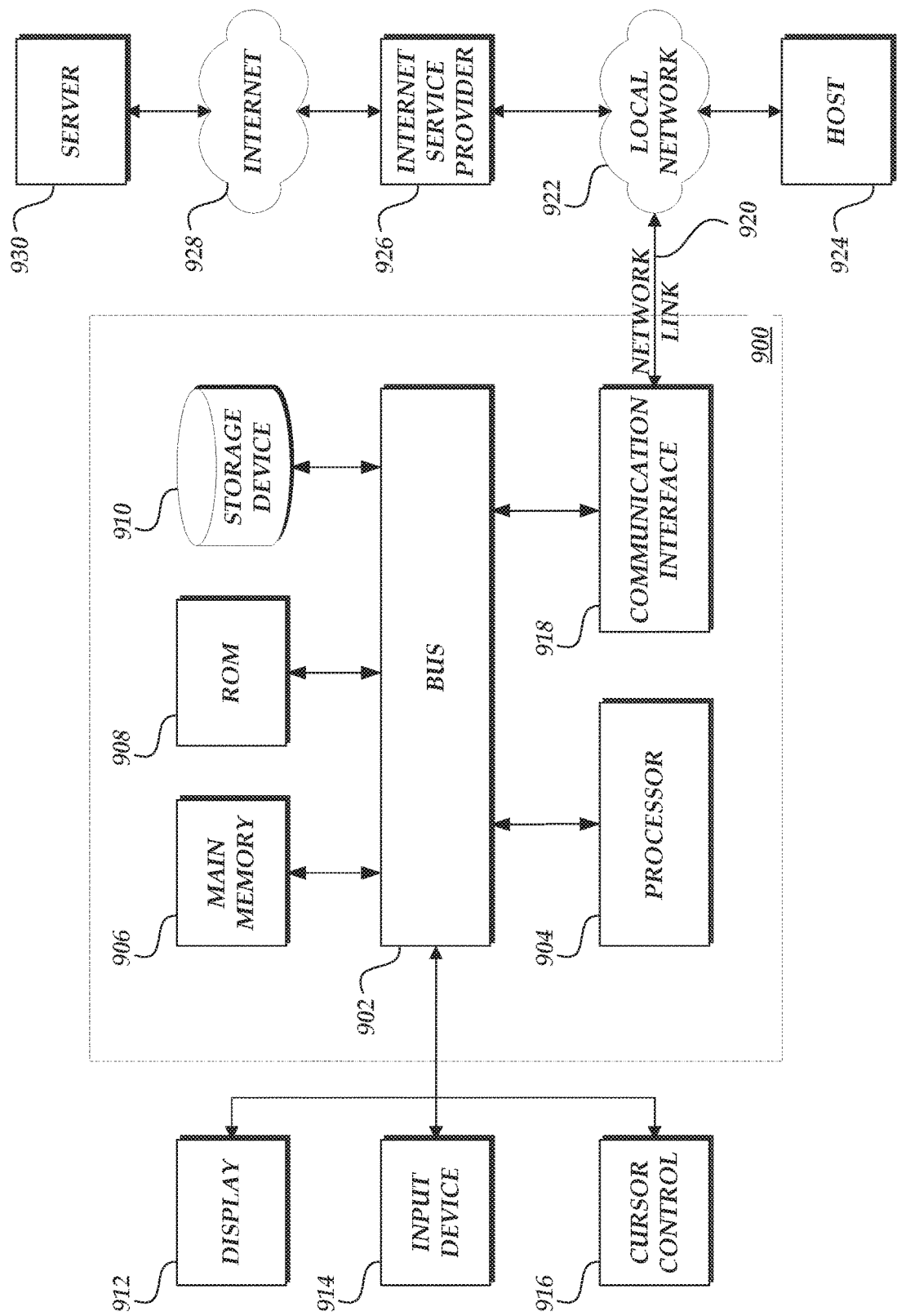
FIG. 9 is a block diagram of an example computer system consistent with embodiments of the present disclosure.

FIG. 9 is a block diagram of an example electronic device 900 in communication with various devices. Components of the network topology 100, such as the dynamic data minimization server 102, presentation server 104, and/or client computing device 150, typically include some or all of the components of electronic device 900, as discussed in further detail below.

As illustrated in FIG. 9, electronic device 900 can include a bus 902 or other communication mechanism for communicating information, and one or more hardware processors 904 (denoted as processor 904 for purposes of simplicity) coupled with bus 902 for processing information. Hardware processor 904 can be, for example, one or more general-purpose microprocessors or it can be a reduced instruction set of one or more microprocessors.

Electronic device 900 also includes a main memory 906, such as a random access memory (RAM) or other dynamic storage device, coupled to bus 902 for storing information and instructions to be executed by processor 904. Main memory 906 also can be used for storing temporary variables or other intermediate information during execution of instructions to be executed by processor 904. Such instructions, after being stored in non-transitory storage media accessible to processor 904, render electronic device 900 into a special-purpose machine that is customized to perform the operations specified in the instructions.

Electronic device 900 further includes a read only memory (ROM) 408 or other static storage device coupled to bus 902 for storing static information and instructions for processor 904. A storage device 910, such as a magnetic disk, optical disk, or USB thumb drive (Flash drive), etc. is provided and coupled to bus 902 for storing information and instructions.

Electronic device 900 can be coupled via bus 902 to an output device 912, such as a cathode ray tube (CRT), liquid crystal display, or touch screen, for displaying information to a computer user. In some embodiments, an input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on output device 912. The input device typically has two degrees of freedom in two axes, a first axis (for example, x) and a second axis (for example, y), that allows the device to specify positions in a plane. In some embodiments, the same direction information and command selections as cursor control can be implemented via receiving touches on a touch screen without a cursor.

Electronic device 900 can include a user interface module to implement a graphical user interface that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Electronic device 900 can implement the techniques described herein using customized hard-wired logic, one or more ASICs or FPGAs, firmware and/or program logic which in combination with the computer system causes or programs electronic device 900 to be a special-purpose machine. According to some embodiments, the operations, functionalities, and techniques and other features described herein are performed by electronic device 900 in response to processor 904 executing one or more sequences of one or more instructions contained in main memory 906. Such instructions can be read into main memory 906 from another storage medium, such as storage device 910. Execution of the sequences of instructions contained in main memory 906 causes processor 904 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 910. Volatile media can include dynamic memory, such as main memory 906. Common forms of non-transitory media can include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 902. Transmission media can also take the form of acoustic or light waves, such as those generated during radio-wave and infra-red data communications.

Various forms of media can be involved in carrying one or more sequences of one or more instructions to processor 904 for execution. For example, the instructions can initially be carried on a magnetic disk or solid state drive of a remote computer. The remote computer can load the instructions into its dynamic memory and send the instructions over a telephone line using a modem. A modem local to electronic device 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 can optionally be stored on storage device 910 either before or after execution by processor 904.

Electronic device 900 can also include a network interface 918 coupled to bus 902. Network interface 918 can provide a two-way data communication coupling to a network link 920 that can be connected to a local network 922. For example, network interface 918 can be an integrated services digital network (ISDN) card, cable modem, satellite modem, or a modem to provide a data communication connection to a corresponding type of telephone line. As another example, network interface 918 can be a local area network (LAN) card to provide a data communication connection to a compatible LAN. Wireless links can also be implemented. In any such implementation, network interface 918 can send and receives electrical, electromagnetic or optical signals that carry digital data streams representing various types of information.

Network link 920 can typically provide data communication through one or more networks to other data devices. For example, network link 920 can provide a connection through local network 922 to a host computer 924 or to data equipment operated by an Internet Service Provider (ISP) 926. ISP 926 in turn can provide data communication services through the world wide packet data communication network now commonly referred to as the "Internet" 928. Local network 922 and Internet 928 can both use electrical, electromagnetic or optical signals that carry digital data streams. The signals through the various networks and the signals on network link 920 and through network interface 918, which carry the digital data to and from electronic device 900, can be example forms of transmission media.

Electronic device 900 can send messages and receive data, including program code, through the network(s), network link 920 and network interface 918. In the Internet example, a server 930 can transmit a requested code for an application program through Internet 928, ISP 926, local network 922 and network interface 918. The received code can be executed by processor 904 as it is received, and/or stored in storage device 910, or other non-volatile storage for later execution. In some embodiments, server 930 can provide information for being displayed on a display.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as example only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the example methods or processes disclosed herein. Further, the inventions illustratively disclosed herein suitably may be practiced in the absence of any element or aspect which is not specifically disclosed herein, such as without.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. For example, a general purpose computer comprising one or more processors should not be interpreted as excluding other computer components, and may possibly include such components as memory, input/output devices, and/or network interfaces, among others. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   a data store configured to store computer-executable instructions; and
   a hardware processor in communication with the data store, wherein the computer-executable instructions, when executed, configure the hardware processor to:
   receive, from a presentation server, a first request to access an item of protected information;
   determine, based at least in part on at least one of the first request or an information type of the item of protected information, that the item of protected information is to be minimized;
   obtain the item of protected information;
   identify, based at least in part on the information type of the item of protected information, a transformation function from a plurality of transformation functions, wherein individual transformation functions are identified from the plurality of transformation functions on a per-request or per-item basis;
   cause the transformation function to be applied to the item of protected information to produce an item of minimized information that preserves one or more characteristics of the item of protected information, wherein the item of minimized information reduces a determinable association between the item of minimized information and an identity associated with the item of protected information;
   cause the presentation server to display a user interface to render the item of minimized information that preserves one or more characteristics of the item of protected information instead of the item of protected information;
   receive, from the presentation server, a second request to access the item of protected information;
   determine, based at least in part on a physical location associated with the second request or a security of a connection associated with the second request, that access to the item of protected information is to be allowed; and
   cause the presentation server to display an updated user interface to replace the item of minimized information with the item of protected information.

2. The system of claim 1, wherein the transformation function comprises one or more of a generalizing function, a depersonalizing function, an anonymizing function, a character masking function, an encryption function, a hashing function, a bucketing function, a randomizing function, or a precision decreasing function.

3. The system of claim 1, wherein the information type of the item of protected information comprises a name type, an address type, a telephone number type, an identification number type, a location type, a salary type, an income type, a password type, a date type, a health record type, or a test score type.

4. The system of claim 1, wherein the hardware processor is further configured to generate user interface data useable to render the item of minimized information.

5. The system of claim 1, wherein the hardware processor is further configured to determine the one or more characteristics of the item of protected information that are preserved by the item of minimized information.

6. The system of claim 5, wherein the one or more characteristics are determined based at least in part on the first request.

7. A computer-implemented method comprising:
- determining, by a first computing device, that an item of protected information is to be minimized;
- identifying, by the first computing device, a transformation function from a plurality of transformation functions based at least in part on an information type of the item of protected information, wherein individual transformation functions are identified from the plurality of transformation functions on a per-request or per-item basis;
- applying, by the first computing device, the transformation function to the item of protected information to produce an item of minimized information that preserves one or more characteristics of the item of protected information, and wherein the item of minimized information reduces a determinable association between the item of minimized information and an identity associated with the item of protected information;
- transmitting, by the first computing device, the item of minimized information to a second computing device, wherein transmitting the item of minimized information causes the second computing device to display a user interface that includes the item of minimized information that preserves one or more characteristics of the item of protected information and excludes the item of protected information;
- receiving, by the first computing device, a request from the second computing device to de-minimize the item of minimized information;
- determining, based at least in part on a physical location associated with the request, that access to the item of protected information is to be allowed; and
- transmitting, by the first computing device, the item of protected information to the second computing device, wherein transmitting the item of protected information causes the second computing device to display an updated user interface that includes the item of protected information.

8. The computer-implemented method of claim 7, wherein determining that the item of protected information is to be minimized is based at least in part on the item of protected information.

9. The computer-implemented method of claim 7, wherein determining that the item of protected information is to be minimized is based at least in part on a previous request for the item of protected information.

10. The computer-implemented method of claim 9, wherein the previous request for the item of protected information identifies a requesting entity, and wherein determining that the item of protected information is to be minimized is based at least in part on the requesting entity.

11. The computer-implemented method of claim 7, wherein the user interface further includes at least a user interface control that, when selected, generates the request to de-minimize the item of minimized information.

12. The computer-implemented method of claim 11 further comprising:
- determining, by the first computing device, a reverse transformation function associated with the transformation function; and
- applying, by the first computing device, the reverse transformation function to the item of minimized information to produce the item of protected information.

13. The computer-implemented method of claim 7, wherein the one or more characteristics of the item of protected information that are preserved by the item of minimized information include one or more of a portion of the item of protected information, a geographic region corresponding to the item of protected information, or a numerical range corresponding to the item of protected information.

14. A non-transitory computer-readable storage medium including computer-executable instructions that, when executed by a processor, configure the processor to:
- determine that an item of protected information is to be minimized;
- identify, based at least in part on an information type of the item of protected information, a transformation function from a plurality of transformation functions, wherein individual transformation functions are identified from the plurality of transformation functions on a per-request or per-item basis;
- apply the transformation function to the item of protected information to produce an item of minimized information that preserves one or more characteristics of the item of protected information, and wherein the item of minimized information reduces a determinable association between the item of minimized information and an identity associated with the item of protected information;
- cause a presentation server to display a user interface that includes the item of minimized information that preserves one or more characteristics of the item of protected information and excludes the item of protected information;
- receive, from the presentation server, a request to access the item of protected information;
- determine, based at least in part on a security of a connection associated with the request, that access to the item of protected information is to be allowed; and
- cause the presentation server to display an updated user interface that includes the item of protected information.

15. The non-transitory computer-readable storage medium of claim 14, wherein the processor is further configured to generate at least a portion of the user interface that includes the item of minimized information that preserves one or more characteristics of the item of protected information and excludes the item of protected information.

16. The non-transitory computer-readable storage medium of claim 14, wherein the processor is configured to determine that the item of protected information is to be minimized in response to a previous request to access the item of protected information.

17. The non-transitory computer-readable storage medium of claim 16, wherein the processor is configured to determine that the item of protected information is to be minimized based at least in part on an access level associated with the previous request to access the item of protected information.

18. The non-transitory computer-readable storage medium of claim 14, wherein the processor is further configured to identify the transformation function based at least in part on a degree of privacy associated with the item of protected information.

19. The non-transitory computer-readable storage medium of claim 14, wherein the transformation function dissociates the item of protected information from a second item of information.

* * * * *